United States Patent [19]
Fujisaki et al.

[11] Patent Number: 5,963,666
[45] Date of Patent: *Oct. 5, 1999

[54] CONFUSION MATRIX MEDIATED WORD PREDICTION

[75] Inventors: Tetsunosuke Fujisaki, Armonk; Savitha Srinivasan, Yorktown Heights, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/516,785

[22] Filed: Aug. 18, 1995

[51] Int. Cl.$^6$ ....................................................... G06K 9/62
[52] U.S. Cl. ........................... 382/187; 382/218; 382/225; 382/228
[58] Field of Search ..................................... 382/187, 309, 382/310, 225, 228, 229, 177, 186, 230, 217, 218; 707/534

[56] References Cited

U.S. PATENT DOCUMENTS

| | | | |
|---|---|---|---|
| 3,969,698 | 7/1976 | Bollinger et al. | 382/310 |
| 4,058,795 | 11/1977 | Balm | 382/230 |
| 4,355,371 | 10/1982 | Convis et al. | 382/310 |
| 4,573,196 | 2/1986 | Crane et al. | 382/187 |
| 4,718,102 | 1/1988 | Crane et al. | 382/187 |
| 4,829,576 | 5/1989 | Porter | 381/43 |
| 4,969,097 | 11/1990 | Levin | 707/534 |
| 5,027,406 | 6/1991 | Roberts et al. | 381/43 |
| 5,048,113 | 9/1991 | Yamagata et al. | 382/310 |
| 5,329,609 | 7/1994 | Sanada et al. | 395/2.6 |
| 5,367,453 | 11/1994 | Capps et al. | 707/531 |
| 5,566,248 | 10/1996 | Ulrich | 382/187 |
| 5,774,588 | 6/1998 | Li | 382/230 |
| 5,802,205 | 9/1998 | Emico et al. | 382/187 |
| 5,805,911 | 9/1998 | Miller | 707/534 |
| 5,835,635 | 11/1998 | Nozaki et al. | 382/226 |

OTHER PUBLICATIONS

N. Itoh et al, "Post–Processing of On–Line Character Recognition–Completion in Japanese Address and Name", Proc. 4th International Workshop on Frontiers in Handwriting Recognition, Dec. 7–9, 1994.

Window for Pens v1.0—Overview manual.

Lexicus Longhand™ Handwriting Recognition Software for Developers manual.

TechMonitoring™ SRI International, TechLink, Natural Language Proc. 1991, pp. 1–6.

Primary Examiner—Jon Chang
Attorney, Agent, or Firm—F. Chau & Associates, LLP

[57] ABSTRACT

A system and method for performing an incremental search using a character string returned by a recognizer on a confusion matrix encoded dictionary to predict a word in a handwriting input field of an application program. In the system and method, handwritten characters are input into a data entry field of an application program. The handwritten characters are recognized and assigned a cluster code. The string of characters is characterized by the cluster codes of the individual characters. The cluster codes of the string are compared with strings of cluster codes representing words in a dictionary. All or some of the matching words are displayed to the user, from which a selection can be made.

21 Claims, 13 Drawing Sheets

FIG. 10
TOP THREE CONFUSIONS FOR CHARACTERS A THROUGH Z

| | | | |
|---|---|---|---|
| 1. A: | K (3.28%) | G (3.28%) | U (2.56%) |
| 2. B: | P (6.33%) | R (4.97%) | H (3.06%) |
| 3. C: | G (2.10%) | A (2.08%) | O (1.57%) |
| 4. D: | P (13.75%) | A (3.08%) | V (3.08%) |
| 5. E: | P (3.6%) | L (3.09%) | C (2.43%) |
| 6. F: | E (4.76%) | T (4.58%) | Y (3.85%) |
| 7. G: | Y (12.68%) | H (6.10%) | A (5.34%) |
| 8. H: | N (4.58%) | A (4.44%) | K (3.87%) |
| 9. I: | L (6.75%) | T (1.36%) | C (1.36%) |
| 10. J: | I (11.63%) | T (3.32%) | F (1.70%) |
| 11. K: | U (5.99%) | H (3.61%) | Y (2.59%) |
| 12. M: | N (6.15%) | W (2.93%) | R (2.22%) |
| 13. N: | W (10.31%) | R (7.60%) | H (6.23%) |
| 14. O: | D (2.61%) | F (0.63%) | A (0.60%) |
| 15. P: | Y (4.09%) | H (2.37%) | I (1.47%) |
| 16. Q: | G (12.55%) | Y (1.92%) | N (1.92%) |
| 17. R: | V (6.63%) | T (4.59%) | P (2.57%) |
| 18. S: | G (4.28%) | J (2.89%) | R (2.86%) |
| 19. T: | F (5.55%) | P (4.91%) | X (2.10%) |
| 20. U: | V (22.76%) | O (8.64%) | A (7.48%) |
| 21. V: | U (11.07%) | O (1.55%) | R (0.77%) |
| 22. W: | N (6.44%) | U (3.16%) | V (2.34%) |
| 23. X: | Y (10.26%) | K (5.51%) | F (3.22%) |
| 24. Y: | G (4.65%) | K (2.34%) | F (1.55%) |
| 25. Z: | E (3.87%) | S (3.10%) | L (3.10%) |

FIG. 11
TWO NONOVERLAPPING CLUSTERING SCHEMES

1. BDEP        BCDEPIL
2. CIL         AHKMNORUVWZ
3. OUV         FT
4. HMNAWZ      XYJGQS
5. AK
6. GJQSXY

FIG. 12
OVERLAPPING CLUSTERING SCHEME

1. AGYBS
2. GHNWQY
3. BPYD
4. EFTPZ
5. HNAK
6. LICJ
7. RUVKDT
8. MNWU
9. XYK

FIG. 15
RAW DICTIONARY

1. SMITH
2. JOHNSON
3. WILLIAMS
4. JONES
5. BROWN
6. MILLER

FIG. 16
(NONOVERLAPPING CLUSTERS) ENCODED DICTIONARY

1. SMITH      64254
2. JOHNSON      6344634
3. WILLIAMS      42222746
4. JONES      63416
5. BROWN      14344
6. MILLER      422214

OVERLAPPING CLUSTER ENCODING FOR FIRST 3 CHARACTERS

1. SMITH      18632
2. JOHNSON    6722422    6752422
3. WILLIAMS   26611224   86611224
4. JONES      67214      67514      67814
5. BROWN      37722
6. MILLER     866112

CONFUSION MATRIX MEDIATED WORD PREDICTION

FIELD OF THE INVENTION

The invention relates to information entry systems using handwriting recognition technology.

BACKGROUND AND SUMMARY OF THE INVENTION

From the user's point of view, pen based entry systems that use handwriting recognition technology provide a natural computer interface for form filling applications. Unfortunately, no handwriting recognition system is perfect and it is the common experience that correction of errors is the most time consuming and difficult part of using such systems. Conventional handwriting recognition systems provide facilities for error corrections such as rewriting a character, using an alternate word list or using a soft keypad. Each of these error correction techniques is time consuming and can be frustrating to the user.

Another important problem in designing pen based applications is identifying correct interfaces for pen and handwriting recognition based systems. Entry of numerals and ordinary words from a small finite dictionary may be better performed with a virtual keyboard or menu selection process. Handwriting recognition provides an ideal interface in situations where a word must be identified from a set too numerous to list in menu format.

Given the difficulties associated with pen based recognition systems, a system which predicts a whole word from a written substring and presents the user with a candidate list menu selection, known as autocompletion, is a desirable interface. In particular, a system that could predict a whole string from an ambiguous substring which may contain misrecognition errors would be particularly useful. This would give the application a look and feel of near 100% accuracy, despite the handwriting recognition technology accuracy being less than 100%.

The present invention relates to the field of applications that use handwriting recognition technology as a means of data entry for form filling. It specifically applies to applications which may contain one or more handwriting input fields in which discrete character recognition is used. Each input field typically has a set of well defined choices in a dictionary from which the user may make a selection.

It is known to use dictionary matching at various levels in the application or by displaying alternates for the purpose of error correction. Other techniques for improving usability of handwriting recognition based applications include incorporating some form of constraints in the input fields, rule based discrimination and the use of spell checkers to improve the recognition accuracy.

Known systems can be divided into two broad categories. The first includes the use of dictionaries to improve recognition accuracy and the use of dictionaries to perform postprocessing after recognition occurs.

The second category of known systems is the use of alternates for a given recognized word. The concept of selecting from a list of alternates for error correction fundamentally applies to recognition technology that works at a word level, such as cursive handwriting recognition or discrete speech recognition. Discrete handwriting recognition technology works at the character level, and applying the concept of alternate lists for error correction would imply having to correct each character which is in error, one at a time, in order to complete data entry in a given field in the form filling application. This is not an efficient technique both in terms of speed of use and usability of the application.

Another approach using the alternate list returned from the recognizer is to conduct an incremental search in the dictionary associated with a specific field for each recognized character and its alternates. This is not a practical real time solution for two reasons: 1) there is no guarantee that the recognizer returns all possible confusions for a specific character when the alternates are queried; and 2) the search space in the dictionary is of the order of m to the power of n where m is the number of alternates used in the search and n is the position number of the character returned by the recognizer. This search cannot be performed in real time with present technologies.

Other systems perform an incremental search by adding the successively recognized character or word to the search process. Still other known systems refer to certain external techniques to improve the appearance of recognition in an application.

Thus, it can be seen that it would be desirable to design a method by which the intended word for a specific field appears in a list as short as possible, with high accuracy and real time performance, despite the accuracy of the recognition technology being less than 100%. This gives the user a speedy data entry interface with near 100% accuracy.

The foregoing objectives can be met in accordance with the invention through the use of a confusion matrix mediated prediction system. The confusion matrix for a specific character is a list of probabilities of that character being confused with every other character in the character set. A confusion matrix for the entire English character set of 83 characters including alphabets, numerals and punctuations is such a list of probabilities for each character in the character set.

FIGURES

Figure 4A:
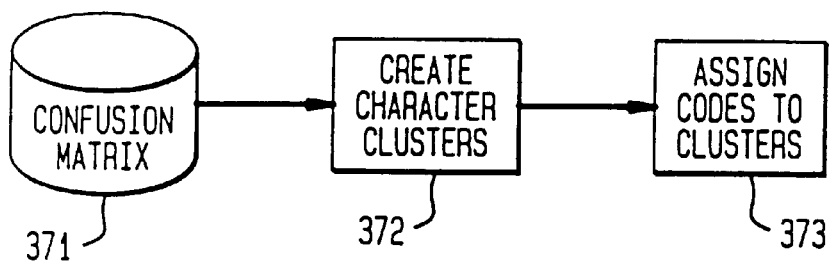
Figure 4B:
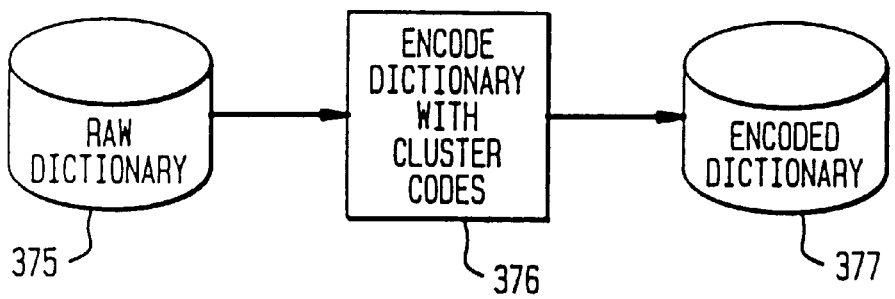
Figure 4C:
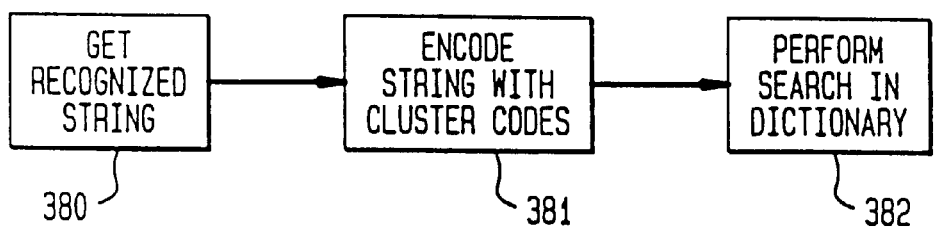

FIGS. 4*a*, 4*b*, and 4*c* show the three main subprocesses which the present invention consists of.

Figure 5:
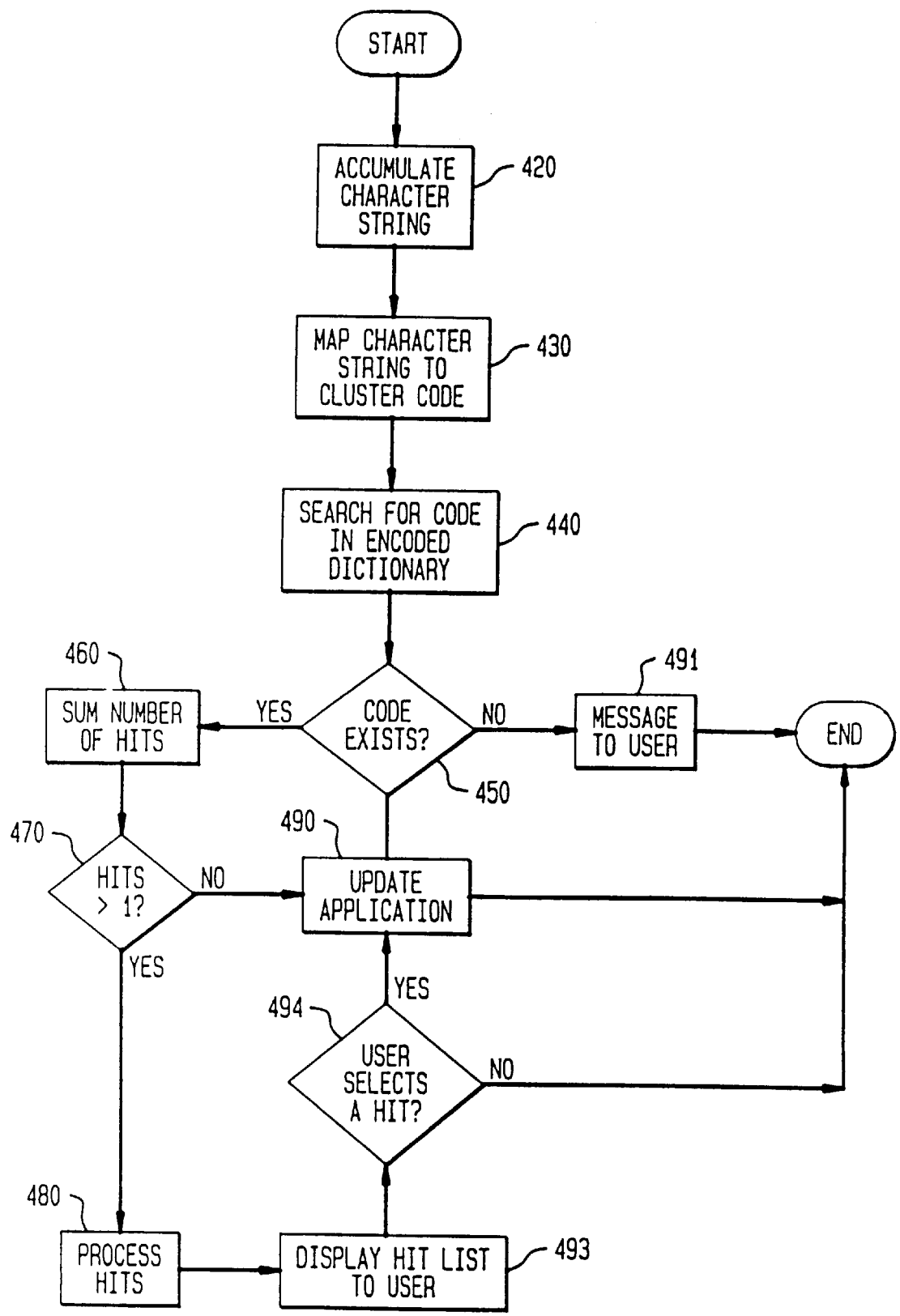

FIG. 5 is a flow chart which describes the search process of FIG. 4*c* which uses the confusion matrix data.

Figure 6:
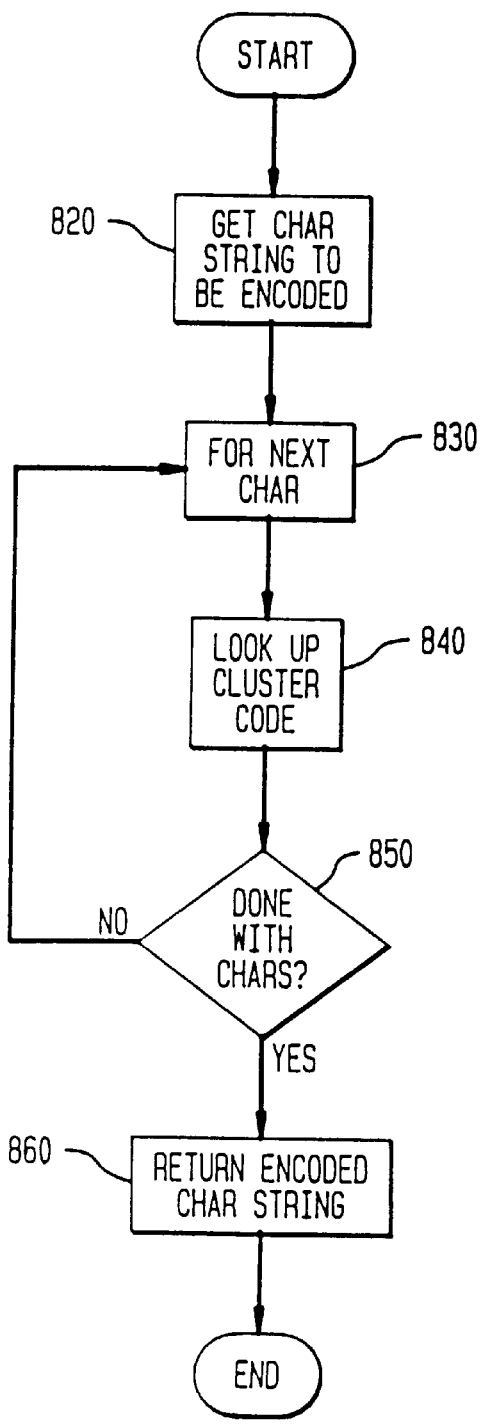

FIG. 6 is a flow chart which describes the mapping of a character string to a cluster code performed in FIG. 5.

Figure 7:
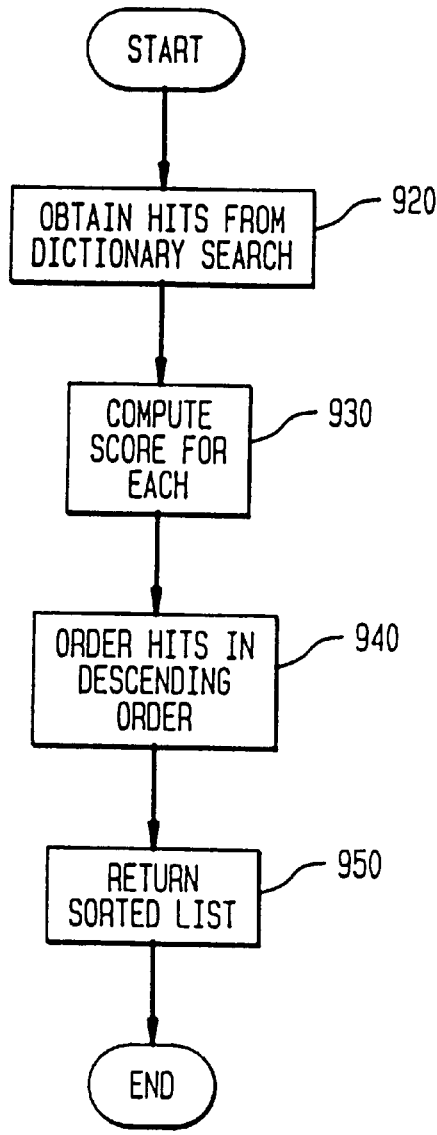

FIG. 7 is a flow chart that describes the processing of the dictionary hits obtained in FIG. 5.

Figure 8:
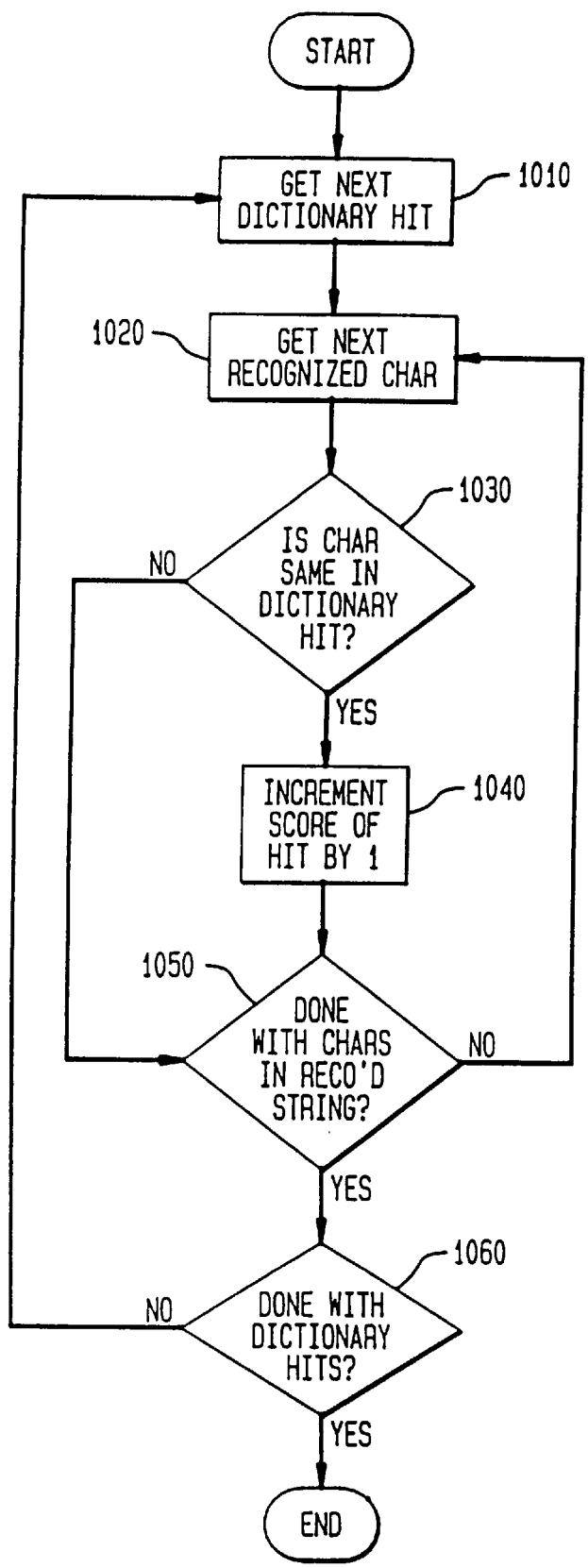

FIG. 8 is a flow chart that describes the computation of a score for the dictionary hits obtained in FIG. 7.

Figure 9:
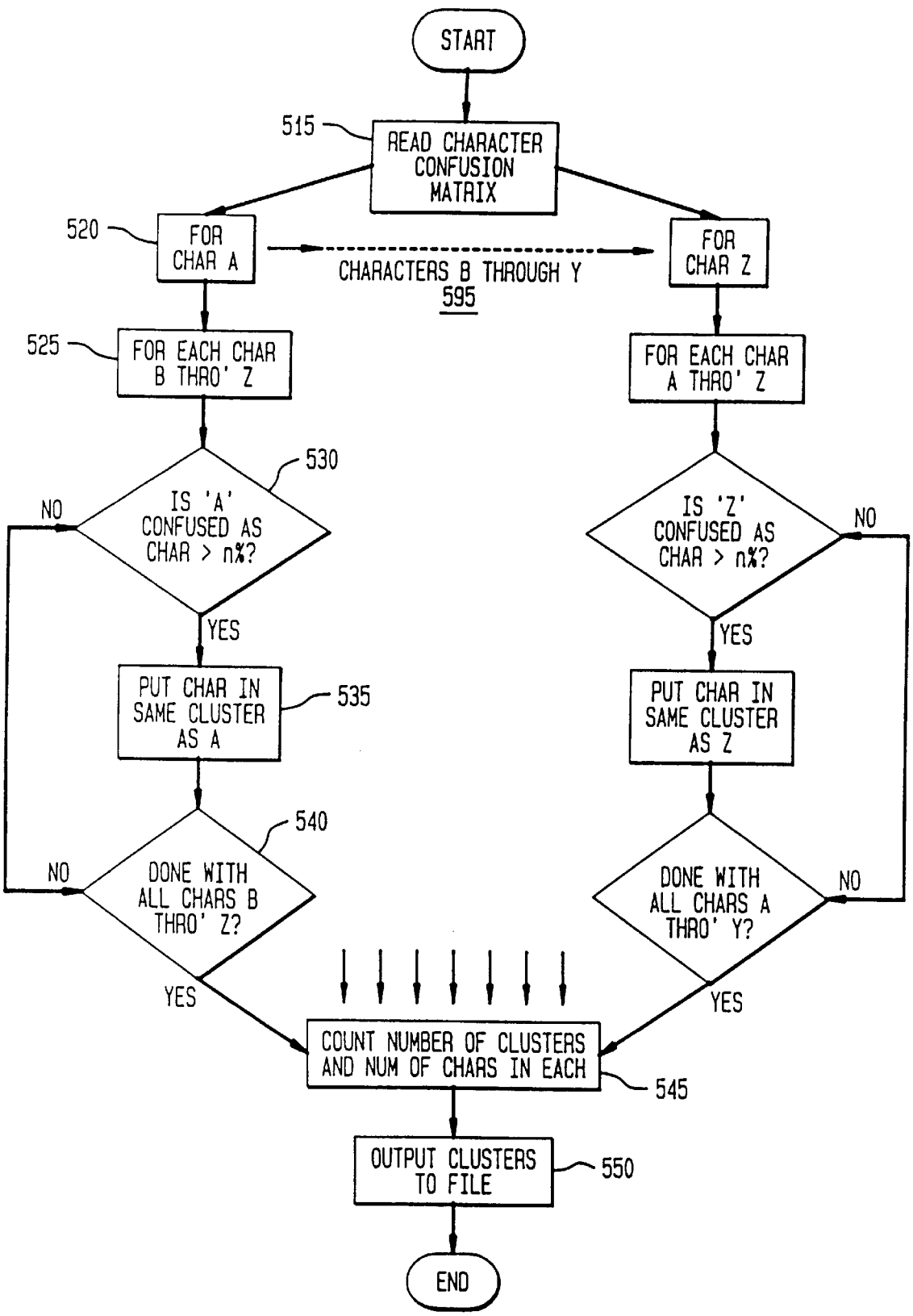

FIG. 9 is a flow chart that describes the creation of the character clusters based on confusion matrix data as seen in FIG. 4*a*.

FIG. 10 is a table of top three confusions for the characters A through z referred to in the description of FIG. 9.

FIG. 11 is an example of nonoverlapping character clustering schemes as referred to in the description of FIG. 9.

FIG. 12 is an example of an overlapping character clustering scheme as referred to in the description of FIG. 9.

Figure 13:
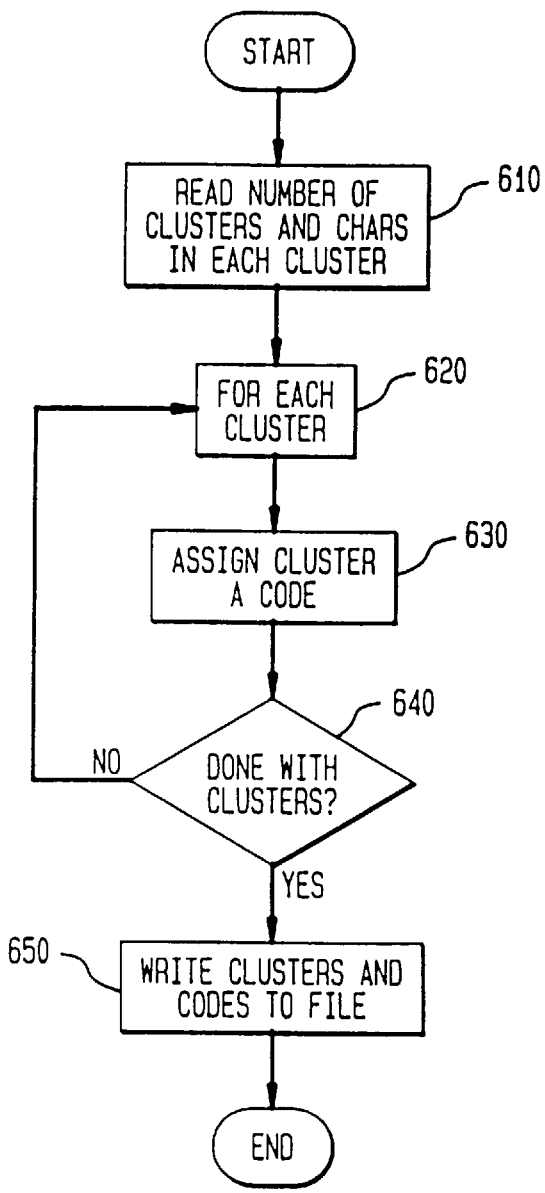

FIG. 13 is a flow chart showing the assignment of codes to the character clusters created in FIG. 4*a*.

Figure 14:
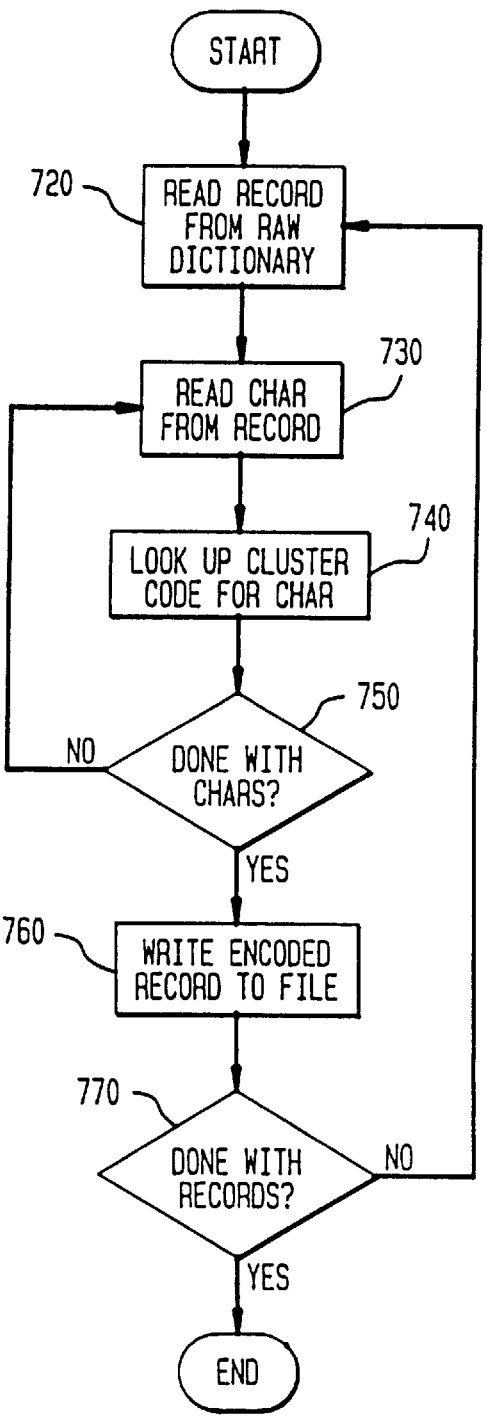

FIG. 14 is a flow chart describing the process of encoding a dictionary with character confusions as shown in FIG. 4b.

FIG. 15 is an example of a raw dictionary referred to in the description of FIG. 14.

FIG. 16 is an example of a nonoverlapping cluster encoded dictionary referred to in the description of FIG. 14.

Figures 17, 19:
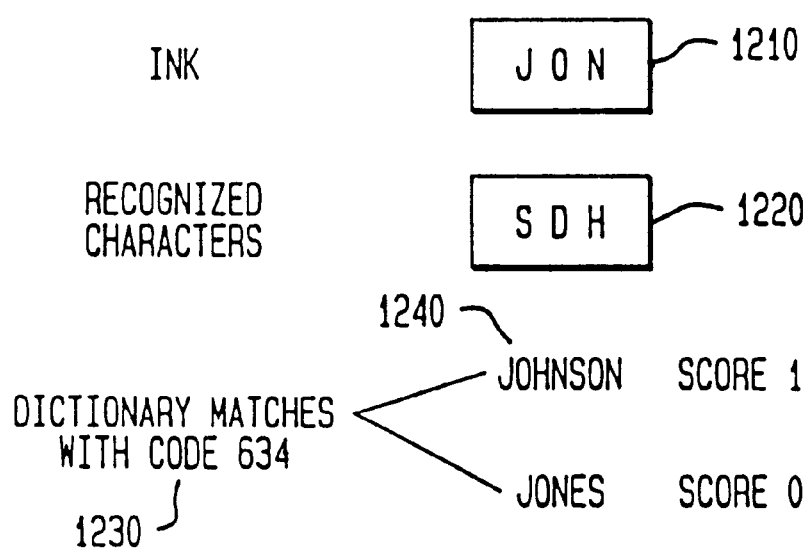

FIG. 17 is an example of an overlapping cluster encoded dictionary referred to in the description of FIG. 14.

Figure 2:
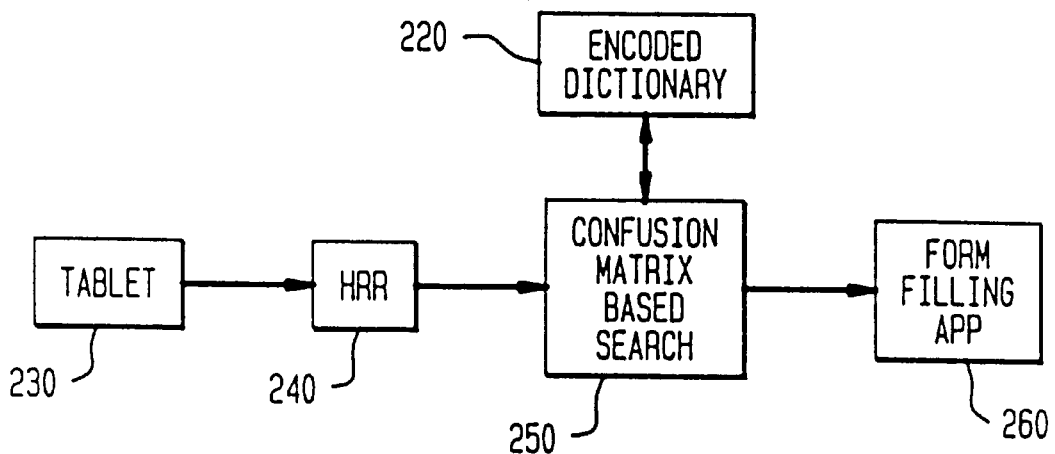
FIG. 2 is a flow diagram showing the flow of information in the system according to the invention.
Figure 18:
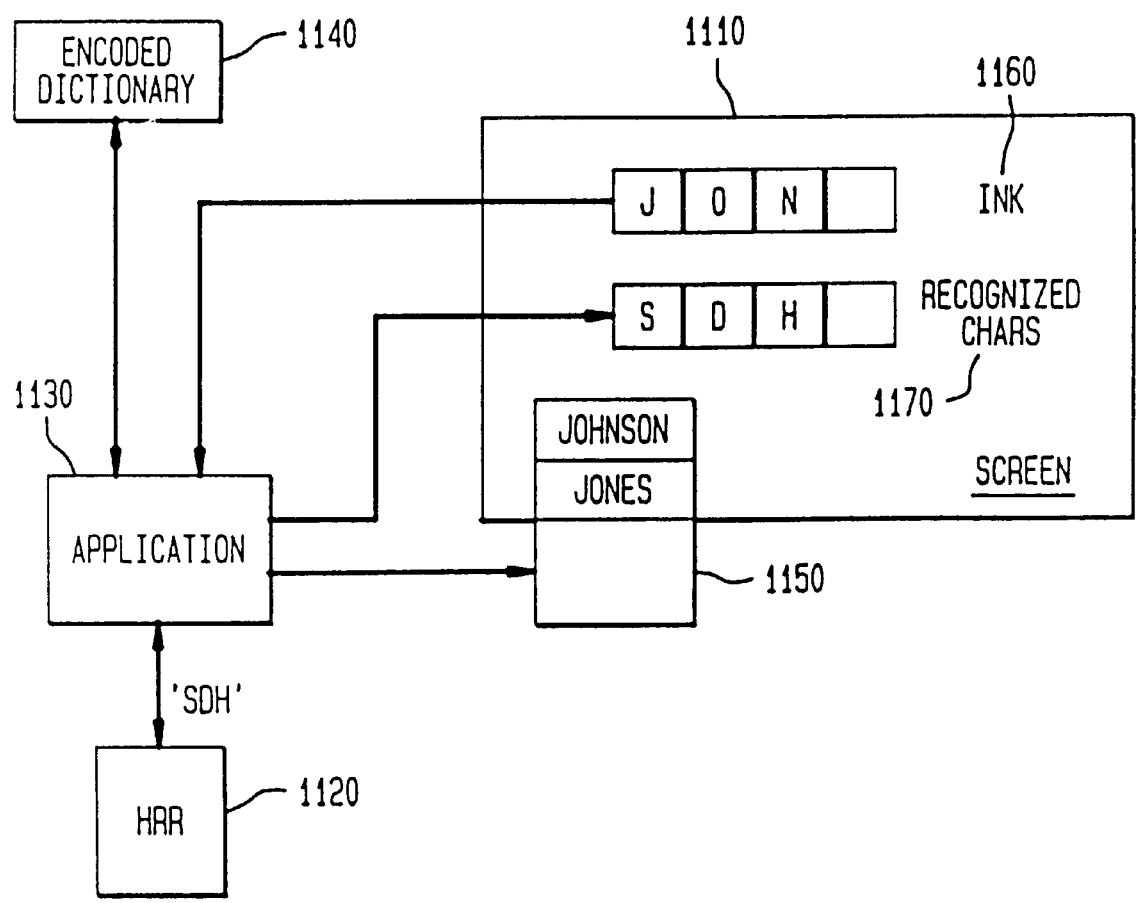

FIG. 18 is an illustration of one possible interface in the use of the invention as described in FIG. 2.

FIG. 19 is a detailed example of the invention referred to in FIG. 18.

DETAILED DESCRIPTION

Figure 1:
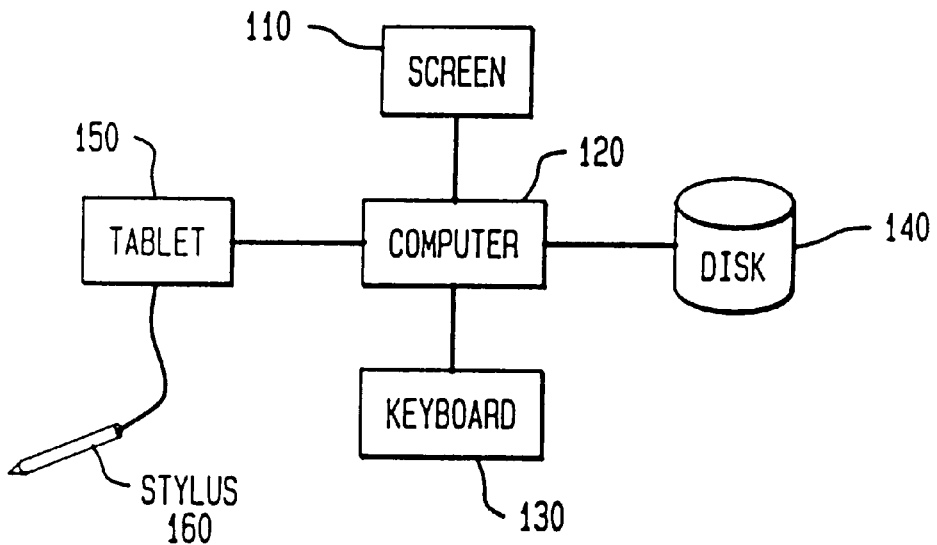
FIG. 1 is a block diagram showing the basic components of the computing environment which supports the present invention.

The invention described below is practiced in the context of a computing system such as that in FIG. 1. It comprises a computer or a workstation 120 which includes a hard disk drive 140. The application which uses the invention runs on the computer 120 and its visual representation is displayed on the screen 110. The user interacts with the application by writing with a stylus or an electronic writing device 160 on a tablet or an electronic writing surface 150. In addition, it may contain an optional keyboard 130, for data entry to the application using keystrokes.

It should be understood that the display and handwriting digitizer which are shown as separate components are frequently combined into a single unit for the convenience of the user. This does not affect the function of this invention. The exact hardware configuration may be dictated by the environment in which the application is running. For example, a mobile computing environment may find the single unit comprising the display and handwriting digitizer convenient. As opposed to this, a kiosk-based stationary application may find a separate display with an attached tablet acceptable. Various combinations of the display and digitizer are commercially available.

A confusion matrix mediated word prediction system which runs in a computing environment described above is shown in FIG. 2. The system comprises a tablet or electronic writing surface 230 on which strokes are written using the stylus or electronic writing device 160 described in FIG. 1. The strokes are captured and sent to the handwriting recognition system 240. The handwriting recognition system 240, which is described in detail in FIG. 3 below, accepts as input electronic ink captured by the tablet 230 and converts it into characters. The recognized characters are then passed to the confusion matrix based search process 250, described in detail in FIG. 5 below. The results of the search performed by the search process 250 are then presented to the user in the visual representation of the form filling application 260. A typical scenario in which the present invention is used is described later with respect to FIG. 19.

Figure 3:
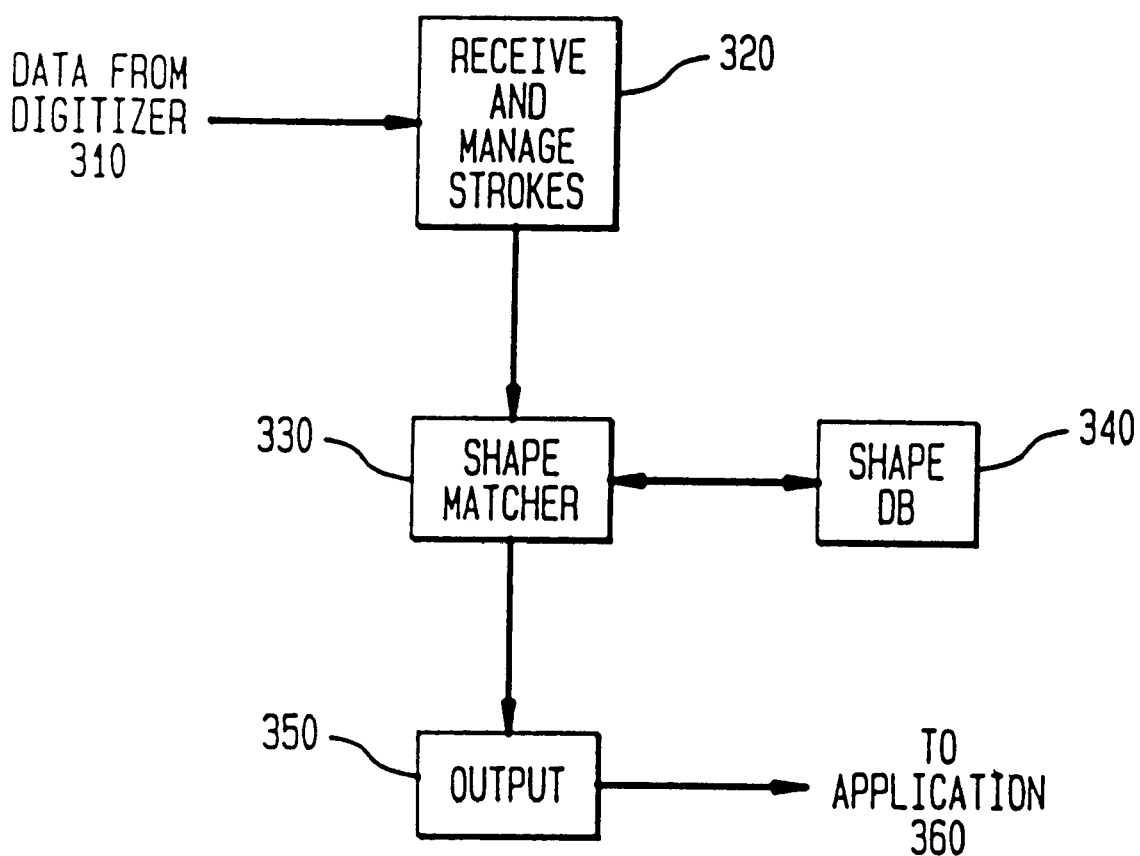
FIG. 3 is a high level block diagram of a handwriting recognition system that the present invention uses.

The internal algorithms used in the handwriting recognition system 240 are not the focus of the present invention, but are nevertheless now described in connection with FIG. 3. A more detailed description of a handwriting recognition system that can be used with the present invention can be found in U.S. Pat. No. 5,315,667, issued May 24, 1994 to Fujisaki et al., incorporated by reference herein. The handwriting recognition system of FIG. 3 comprises the data from the digitizer 310 being passed to a stroke manager 320, which receives and manages strokes from the user. The strokes are then passed to a shape matcher 330 which compares the strokes received from the user with the strokes in the shape database 340 and generates a best match and fields it to the output process 350. The recognized characters are then passed on to the application 360. In the context of the present invention, the application 360 can be considered to be the form filling application referred to in FIG. 2 as 260.

The confusion matrix for any character set is generated by the handwriting recognizer by running benchmarks with a diverse number of users under varying circumstances. The accuracy results of such tests are compiled and put together to produce the confusion matrix for a given recognizer. Thus, the confusion matrix is generated from statistical results obtained from testing the accuracy of the recognizer, rather than from a single instance of running the recognizer itself.

The confusion matrix mediated word prediction system shown in block 250 of FIG. 2 above actually comprises three subprocesses, each of which must be performed in a predetermined order for the system to operate properly. These subprocesses are described in FIGS. 4a, 4b and 4c. FIG. 4a shows the process of creating character clusters 372 using the confusion matrix 371 and assigning codes to them in 373. A cluster is a subset of characters from the character set which are grouped together and assigned an arbitrary code. The confusion matrix 371 drives the clustering process and is described in detail with respect to FIG. 9.

FIG. 4b shows the process of encoding in block 376 a raw dictionary 375 with cluster codes generated by the process of FIG. 4a to generate an encoded dictionary 377. A raw dictionary is the base list of entries associated with a given handwriting input field in a form filling application. A real form filling application may have dictionaries with the number of entries of the order of 100,000 associated with each field. An encoded dictionary is the raw dictionary records encoded with a numbering scheme resulting from the clustering scheme arrived at in FIG. 4a. It is the output of this encoding process that is used as the encoded dictionary 220 of FIG. 2 to perform the confusion matrix based search. This process is described in detail with respect to FIG. 5.

FIG. 4c shows the actual production component of the system which is used in the invention to perform the search. The recognized characters returned by the recognizer 380 are encoded in block 381 with the cluster codes generated in the FIG. 4a process above. The encoded characters are then used to perform a search in 382 on the encoded dictionary to predict the word that is being written by the user.

The processes depicted in FIGS. 4a and 4b must be completed prior to the process of FIG. 4c being invoked. The process of FIG. 4a is typically performed first to arrive at the optimal clusters. A few iterations may be necessary to determine the optimal clustering scheme. The optimal clustering scheme should result in the dictionary search predicting the correct word in as short a list as possible. FIG. 9 shows the method for determining the optimal clustering scheme where the value of n determines the optimal scheme. The optimal value of n is arrived at by considering the sparseness of the dictionary, such that even a broad clustering scheme would result in a reasonable length word list. Experimental results of dictionaries of 50,000 proper names have yielded the desired result within a list of 10 words using 7 overlapping clusters. The clustering scheme may depend on the nature of the contents of the dictionary also. In addition, the list must be ordered so as to present the correct word as high up in the list as possible. Once a clustering scheme has been identified, the process of FIG. 4b is performed with the chosen scheme to encode the dictionary. This process is shown in detail in FIG. 14. The process of FIG. 4c is the production component of the confusion matrix based search process 250 in FIG. 2.

FIG. 5 shows the search process in detail. This process comprises five functional steps described below. At the start of this process, individual characters from the recognizer described in FIG. 3 are accumulated in step 420 into character strings. This is typically done by a layer of software that runs on top of the handwriting recognizer such that the recognizer does not communicate with the end application directly. Instead, it communicates through this intermediate pen enabling software layer which notifies the application when a character or a string of characters has been recognized by the recognizer. The recognized string is supplied to step 430, where it is mapped to a cluster code that is generated by the cluster creation process based on the confusion matrix described in FIG. 9. The cluster code is generated by step 373 in FIG. 4a above, and is described in more detail with respect to FIG. 9 below. The cluster code for the character string as obtained in step 430 is then passed to perform a search on the encoded dictionary step 440. The search algorithm in itself is not presented in detail here since it is not the focus of the present invention. An efficient search algorithm based on indexing into the actual dictionary is used to achieve acceptable real time performance. Next, a decision is made whether to sum the number of dictionary hits or to display a message to the user about the absence of any dictionary hits, based on the result of the decision block 450 in which the encoded character string search results are evaluated. The number of dictionary hits is computed in 460. A check is performed in 470 for whether the number of hits is greater than one. If the number of hits exceeds one, the results of the search performed in 440 are passed to procedure 480, which orders the number of hits such that the most likely match from the dictionary is on top of the list. This process of ordering the dictionary matches in order to predict the most likely word is described in detail with respect to FIG. 8.

The ordered list of optimal length is presented to the user in step 493. Optimal length is a parameter that may be defined by the application at the time of initialization based on screen space and interface used to present results to the user. A length value which is short enough to be accommodated on the interface presented to the user and is sufficiently long enough to address the problem of displaying correct words from the list of words returned by the dictionary search may be considered as optimal. The length of the list returned from the dictionary search depends directly on the clustering scheme selected, which is described in FIG. 9 below. If a user selects one of the displayed choices in 494, the application updates the screen in 490 and the search process terminates. If the user does not select a displayed choice in 494, the confusion matrix based search process terminates without any change in the user interface.

Continuing now from 450, if the cluster code generated in 430 for the recognized character is not present in the encoded dictionary a message is displayed to the user in 491 and the confusion matrix based search process terminates. This is a possibility and a valid state in the system but is not envisioned in a typical use of the invention. To benefit from the confusion matrix based search mechanism employed, each handwriting input field must have a corresponding dictionary which contains all possible choices for that field. This would result in the dictionary search yielding one or more possible choices in the list which the user may select from for autocompletion of the field.

The procedure which maps a character string into a cluster code performed in 430 above is shown in detail in FIG. 6.

At the start of the process, the character string to be encoded as returned by the recognizer is obtained in 820. Each character is traversed in 830. The corresponding cluster code for the character is looked up in 840 and the cluster code for the entire character string is built by concatenating the cluster codes for each character. Based on the check performed in 850 for having traversed through all the characters of the original character string of 820, the encoded character string is returned in 860. This terminates the encoding process of a character string from the recognizer.

The procedure that processes the hits returned from the dictionary search in 480 of FIG. 5 above is described in detail in FIG. 7. At the start of this procedure, the list of dictionary records which met the search criterion are obtained in 920. A score is computed for each dictionary hit based on comparison with the actual recognized character string in 930. This is described in more detail in FIG. 8 below. In 940, the dictionary hits are ordered by an efficient sort algorithm selected from available sort techniques. The sorted list is then returned in 950.

FIG. 8 describes the actual process of computing scores for each dictionary hit. It should be noted that a somewhat simplistic scoring scheme has been described here and more sophisticated distance computing algorithms are available in the pattern recognition literature. This will lead to a more accurate score representation for the dictionary hits and hence a higher probability of the correct word being at the top of the list being presented to the user.

The preferred approach starts in 1010 by obtaining a single dictionary hit record at a time. The next character in the record is obtained in 1020. This character is compared with the corresponding character in the actual string returned by the recognizer in 1030. If there is a character match, the score of this particular dictionary match is incremented by one in 1040. If not, the next character in the dictionary record is obtained based on the decision made in 1050. This process is repeated for all the dictionary hits based on the check performed in decision block 1060.

This completes a description of the subprocess shown in FIG. 4c which is the production component of the system used by the invention.

A more sophisticated method which factors distances between the recognized characters and the dictionary matches in corresponding positions is described here. This can be done by using the confusion matrix based clusters to compute the distance. If a character in the record is in the same cluster as the corresponding character in the actual recognized string, the score of this particular dictionary match is incremented. Further, the clusters themselves may be assigned a higher or lower score depending on the cohesive nature of each character cluster. For example, a character cluster containing characters BDEP may be considered more cohesive than a character cluster containing characters CIL since character confusion rates within BDEP are greater than 2% where as the character confusion rates within CIL are less than 2%. Therefore, the cluster BDEP may be assigned a score higher than the cluster CIL.

FIG. 9 describes the cluster creation process of FIG. 4a which generates the nonoverlappinq character clusters used in 430 above. A nonoverlapping clustering scheme is one in which no two clusters have a character in common. It comprises three main functional steps described below. At the start of this process, the confusion matrix data for the character set generated by the recognizer described in FIG. 3 is read in from a file in 515. FIG. 10 is an example of the top three confusions for the characters A through Z in the character set recognized by the recognizer. It should be noted that only the top three confusions have been given in FIG. 10 but in fact, the confusion data is available for more characters. In theory, each character has a finite non zero probability of being confused as every other character. Also, the confusions for the characters 'A' through 'Z' alone have been considered. It is possible to consider the confusions for the entire English character set of 83 characters. The number of character confusions evaluated for each character is a decision made in decision block 530 described below.

The next step is the process of traversing through each of the characters 'A' through 'Z' and evaluating the confusions for each with every other character from the character set 'A' through 'Z'. The character 'A' is selected in 520. In step 525, the remaining characters in this character subset of A through Z are used to evaluate confusion rates. For this particular case of having selected character 'A' in 520, the characters 'B' through 'Z' are used in 525 for procedure 530. The confusion rate of character 'A' for the particular character being worked on is read from the confusion matrix 515 and checked if it is greater than a certain percentage n. (See description below for an explanation and issues related to the process of selection of n). If the confusion rate checked in 530 is greater than n%, the character from 525 is added to the same cluster as character 'A'. 540 checks for completion of all the characters that were selected in 525. If the characters 'B' through 'Z' have not yet been evaluated for character 'A' confusions, procedure 530 is repeated for the next character. If the characters 'B' through 'Z' have been checked for character 'A' confusions and have been clustered in 535, procedure 595 is invoked. Procedure 595 is a repetition of the process starting from 520 and ending at 540 above, but starting with characters 'B' through 'Z'.

The next step comprises collecting the results in 545 of the clustering performed in the procedure starting at 520 and being performed identically with different characters in 595. The number of clusters and the characters making up each cluster are collected. This result is then output to a file in 550 which results in the end 560 of the cluster creation process.

It is to be noted that a specific implementation of a clustering scheme has been described in FIG. 9. This process by itself has many possible variations based on desired performance and accuracy. The clustering scheme directly affects the length of the list returned from the dictionary search. It is an empirical process and to arrive at the best clustering scheme may take several iterations. Selecting a broad clustering scheme implies having fewer number of character clusters with more characters in each cluster. This corresponds to a somewhat low value of n, which means that the uncommon confusions are also taken into account. By selecting a low value of n, a greater number of characters will result in the same cluster since a specific character is typically confused with a large number of characters with varying probabilities, some of the probabilities being quite small. As opposed to this, a narrow clustering scheme is one in which there exists a large number of character clusters with few characters in each cluster. This corresponds to a high value of n, which means that the uncommon confusions are not taken into account. A high value of n results in much fewer characters meeting the confusion criterion evaluated in 530 above, thereby resulting in fewer characters per cluster.

The implications of a broad clustering scheme in which fewer clusters exist mean that the dictionary search will yield a larger number of hits. A narrow clustering scheme in which a larger number of clusters exist mean that the dictionary search will yield a smaller number of hits. While it is advantageous to deal with a smaller number of hits in presenting to the user, it is accompanied with the caveat of not representing all possible confusions. A large number of hits from the dictionary search will require intelligent pruning of the list prior to presenting it to the user, so as to get rid of extraneous hits.

Another variation in selecting a clustering scheme is the option of selecting an overlapping or nonoverlapping clustering scheme. An overlapping clustering scheme is one in which a specific character may be a member of more than one cluster. A nonoverlapping clustering scheme is one in which a specific character is a member of one unique cluster. The detailed cluster creation process described in FIG. 9 above describes a nonoverlapping clustering scheme.

FIG. 11 shows an example of two nonoverlapping clustering schemes. The first column represents a narrow clustering scheme in which fewer characters make up each cluster and results in 6 clusters. The second column represents a broad clustering scheme in which more characters make up each cluster and results in four clusters.

Consider the clustering of character 'K'. It is a part of the AK cluster in the narrow clustering scheme and is part of the AHKMNORUVWZ in the broad clustering scheme. Referring back to the confusion matrix presented in FIG. 10, the confusion of K with U (5.99%) is accommodated in the broad clustering scheme but not in the narrow clustering scheme. The disadvantage of the broad clustering scheme is that the U to K confusions are also accommodated. The U to K confusion rate is 1.75%, not represented in the table in FIG. 10 since it is lower than the top three confusions for character 'U'. This situation arises because character confusions are not necessarily symmetric with the same percentage.

FIG. 12 shows an example of overlapping clusters. Character A exists in two clusters AGYBS and HNAK. While overlapping clusters more accurately represent the confusion matrix data, it results in duplication of entries in the encoded dictionary. For example, every occurrence of character A in a record in the dictionary must have two encoded entries corresponding to the two possible clusters that A belongs to. Taking this into account for all the characters in a record could yield a large number of records in the encoded dictionary for each record in the raw dictionary, since each combination of cluster codes for the characters in a word have to be represented. Examples of encoded dictionaries with different clustering schemes accompany the description of the dictionary encoding process described in FIG. 14 described below.

Thus, we see that a large number of factors contribute to the selection of a clustering scheme with different impacts on the size of the dictionary and length and accuracy of the returned list from the dictionary match. A balance between a broad and narrow clustering scheme, an overlapping and nonoverlapping clustering scheme, has to be arrived at keeping in mind the asymmetric nature of character confusions and the impact on the length of the lists returned from the dictionary search. Another important factor which affects the performance of this invention is the efficiency and accuracy of the process of pruning the dictionary hits by computing a score for each dictionary hit.

The subprocess of FIG. 4a also includes the process of assigning codes to each of the clusters arrived at in FIG. 9, represented by 373. A simplistic approach to assigning a code to each of the clusters is described in FIG. 13. At the start of this process, in 610, the total number of character clusters and the characters that make up each cluster are obtained. Each cluster is traversed in 620 to assign a unique code in 630. In this description of the invention, the codes are represented as integer values for the purpose of ease of reference. In an actual implementation, bit values may be selected as codes for each of the clusters so as to conserve disk space when creating the encoded dictionary. A check is performed in 640 to test if all the clusters have been assigned unique codes. If they have been assigned unique codes, the clusters and the contents that make up each cluster are written to a file in 650 and the process ends.

It should be noted that the algorithm to assign a code to a cluster can be refined such that the cluster code used represents the cohesiveness of the characters, or a high confusion rate among the characters in the cluster. This code may then be used in the pruning process of the dictionary hits so as to order the words such that the intended word is as high up in the list as possible.

This concludes the description of subprocess shown in FIG. 4*a*, which is a prerequisite for the dictionary encoding subprocess shown in FIG. 4*b*. The process described here is fundamental to the working of this invention and must be performed in detail to assure a clustering scheme capable of handling most confusions.

The process of encoding a raw dictionary with character cluster codes is shown in FIG. 14. It consists of three functional steps. Step one begins at 720 in which the records in the raw dictionary are traversed one at a time. In step two at 730, the individual characters that make up each record from step one are traversed. The cluster code for each character is identified in 740. After 750 when all the characters have been assigned cluster codes, the encoded dictionary record is created by prefixing the raw dictionary data with the cluster code for that particular record in step 3 at 760. This is to enable a search on the encoded dictionary with the cluster code as the search criterion rather than the character string. In 770, a check is performed for having read all the records in the raw dictionary. If all the records have not been read, steps 1 through 3 are repeated for each of the subsequent records. If all the dictionary records have been traversed, the process of encoding a raw dictionary with cluster codes terminates.

This process of encoding a dictionary with cluster codes may be performed intelligently. For example, a different clustering scheme may be used for the first n characters of each record in the dictionary. The reason for this being that the first few characters will quickly narrow down the list of possible dictionary matches. When the dictionary match is performed with a substring of length 1, if the desired character is not found in the list of dictionary matches, the likelihood of the desired word being in the hit list is none. So, a broad overlapping clustering scheme which represents more of the character confusions for the first n characters of each record in the dictionary is more likely to ensure that the desired word is in the hit list. For subsequent characters of each record in the dictionary, a narrow, nonoverlapping clustering scheme may be adequate since the sparseness of the dictionary would result in the dictionary search yielding the desired result in as short a list as possible.

FIG. 15 represents an example of a raw dictionary. It shows a short list of names that will be encoded with cluster codes. It is such a list of names that may be typically tied to a particular handwriting input field in a form filling application.

FIG. 16 shows an encoded list created from the raw dictionary of FIG. 15. It represents an example of encoding using nonoverlapping clusters, which was shown earlier in column 1 of FIG. 11. The cluster code will prefix the actual name in each record in the encoded dictionary and the dictionary search is performed on the cluster code. From the example in FIG. 16, it can be seen that the names WILLIAMS and MILLER are assigned the same initial cluster code of 4222 for the first four characters. This shows that this particular clustering scheme will address the M to W and W to M confusions since character M and character w are assigned the same cluster code of 4. In addition, this scheme will address the character M confusions with characters HNAWZ since cluster 4 consists of characters HMNAWZ, each with equal weight.

FIG. 17 shows an example of encoding the raw dictionary of FIG. 15 with overlapping clusters shown in FIG. 12. From the example it can be seen that the names WILLIAMS and MILLER are still assigned the same initial cluster code of 8661 such that the W to M confusions are caught. However, WILLIAMS is also assigned an initial cluster code of 2661 which addresses the cluster 2 (GHNWQY) and cluster 8 (MNWU) clusters of the overlapping clusters shown in FIG. 12. This means that in addition to catching the cluster 8 confusions of NWU for the character M, the confusions of character M with GHQY will also be addressed because of cluster 2 (GHNWQY). So, for character M, the current overlapping clustering scheme addresses confusions of characters NWUGHQY, each with equal weight.

FIG. 17 also shows the encoding of the name JONES which has three different cluster codes. This is because the character 'N' belongs to three different character clusters 2 (GHNWQY), 5(HNAK) and 8 (MNWU). This scheme therefore addresses the confusions of character N with characters GHWQYAKMU each with equal weight.

As mentioned above, addressing some of these confusions with unequal weights by assigning a meaningful cluster code will aid the pruning process of the dictionary hits.

In one possible implementation, the overlapping clusters are used only for the first 3 characters in each name and the subsequent characters are encoded using the nonoverlapping clustering scheme shown in column two of FIG. 11. A reason to split the encoding of a dictionary word between overlapping encoding and nonoverlapping encoding is to optimize use of space occupied by the encoded dictionary while at the same time not compromising on the ability to handle all confusions. In this respect, the first few characters may be considered as more important than the latter characters in a dictionary word because it is vital to catch all confusions in the first few characters. If this is not done, however well the rest of the confusions are caught and the pruning process is done, the finer confusions of the first few characters will have been lost. Overlapping clusters more realistically represent character confusions since confusions are not symmetric and follow no particular rules or order within the character set. But assigning multiple cluster codes to a single character and encoding a dictionary record with all those cluster codes will result in replication of the dictionary and so must be carefully assessed. For this reason, splitting the encoding into an overlapping and nonoverlapping scheme for different characters in a dictionary word is desirable.

This concludes the description of subprocess 4*b*, which is a prerequisite for the process of FIG. 4*c*. This process is also fundamental to the working of this invention and must be performed in detail while evaluating various options to arrive at an encoded dictionary which will capture most character confusions.

The end user form filling application which utilizes this invention is described in FIG. 18. It shows a typical scenario in the use of this invention. Other variations in presentation and user interface are possible. The figure shows the application display 1110 on which the visual representation of the application 1130 is displayed. Among other fields, a typical example of a handwriting input field 1160 is shown. 1160 represents the field in which the user writes with the stylus. 1170 represents the field in which the recognized characters are displayed after the ink from 1160 is sent to the recognizer 1120 and recognition occurs. The application first receives the recognized characters from the recognizer 1120. The application 1130 performs a search with the cluster code of the character string it receives from the recognizer on the encoded dictionary 1140. The search returns a list 1150 which is displayed to the user on the display.

Specifically, consider FIG. 19 in which the example presented in FIG. 18 is shown in greater detail. The user writes the characters J O N as shown in 1210 in the input field 1160 of FIG. 18. The recognizer returns characters S D H to the application, which in turn displays the characters in the field 1170. This is shown as 1220 in FIG. 19. The application then obtains the cluster code 634 for the characters S D H using the nonoverlapping clustering scheme of column one in FIG. 11. Considering the sample encoded dictionary of FIG. 16, both the names JOHNSON and JONES have an initial cluster code of 634. Hence the dictionary search returns these two names to the application. The application then prunes this list by computing scores for each record and ordering them. The score computed for JOHNSON is 1 since the third character H is the same as the 3rd character H in the recognized string SDH from the recognizer. JONES has a score of 0 and so is presented second in the list to the user.

This example shows one possible scenario of presenting search results to the user in the context of a form filling application with handwriting input using the invention. It should be noted that other variations in user interface are possible.

Thus it can be seen that the methods described above address a fundamental problem with the current methods used in handwriting recognition based applications. The invention addresses the problem by performing an incremental search with the character string returned by the recognizer on a confusion matrix encoded dictionary to predict the word in a handwriting input field. It will be obvious to those skilled in the art that variations on this method may be developed which provide superior performance or user interface properties in particular applications without departing from the content of this invention.

Having thus described our invention, what we claim as new and desire to secure by Letters Patent is as follows:

1. A system for providing user generated data to an application computer program, comprising:

means for translating a string of handwritten characters representing the user data into digitized handwriting signals, said string of handwritten characters having been previously generated by a character recognition system;

means for comparing the digitized handwriting signals with electronically stored prototype handwriting signals representing prototype handwritten characters and for assigning a closest matching character identifier to each of the digitized handwriting signals;

means for assigning to each closest matching character identifier one or more cluster codes, the cluster codes representing clusters of confusable characters containing the closest matching character;

means for providing, for each combination of cluster codes representing the string of handwritten characters, a string of cluster codes representing the string of handwritten characters;

means for comparing the strings of cluster codes with cluster code strings representing words in a dictionary;

means for generating and displaying a list of words in the dictionary having cluster code strings matching one or more of the strings of cluster codes representing the string of handwritten characters;

means for selecting one of the words from the list; and means for providing the selected word to the application program.

2. The system of claim 1, wherein two or more of the clusters contain a common character.

3. The system of claim 1, wherein the clusters contain no overlapping characters.

4. The system of claim 1, further comprising means for pruning the generated list to remove unlikely matches prior to presenting it to a user.

5. The system of claim 1, further comprising means for ranking the list in order of likelihood of matching the string of closest matching character identifiers associated with the handwritten characters.

6. The system of claim 5, wherein the means for ranking comprises:

means for comparing each character in the string of closest matching characters with its corresponding character in each dictionary word in the generated list and assigning a score based upon the number of character matches or cluster matches and the cohesiveness of the cluster;

means for ordering the generated list based upon the score; and means for removing from the ordered list all but the first n words.

7. The system of claim 5, wherein the string of handwritten characters is less than all of the characters in a word being entered, and wherein the means for generating and displaying generates and displays complete words beginning with the string of handwritten characters.

8. The system of claim 1, further comprising:

means for creating the clusters of confusable characters; and means for encoding a raw dictionary with the cluster codes that represent the character confusions to produce the cluster code strings representing words in a dictionary;

wherein a different clustering scheme may be selected for the encoding of the dictionary for each character.

9. The system of claim 1, wherein the cluster codes represent the cohesiveness of the clusters of confusable characters.

10. The system of claim 1, wherein the clusters are broad, such that each cluster contains many characters, resulting in few clusters.

11. The system of claim 1, wherein the clusters are narrow, such that each cluster contains few characters, resulting in many clusters.

12. A method for providing user generated data to an application computer program, comprising:

translating a string of handwritten characters representing the user data into digitized handwriting signals, said string of handwritten characters having been previously generated by a character recognition system;

comparing the digitized handwriting signals with electronically stored prototype handwriting signals representing prototype handwritten characters and assigning a closest matching character identifier to each of the digitized handwriting signals;

assigning to each closest matching character identifier one or more cluster codes, the cluster codes representing clusters of confusable characters containing the closest matching character;

providing, for each combination of cluster codes representing the string of handwritten characters, a string of cluster codes representing the string of handwritten characters;

comparing the strings of cluster codes with cluster code strings representing words in a dictionary;

generating and displaying a list of words in the dictionary having cluster code strings matching one or more of the strings of cluster codes representing the string of handwritten characters;

selecting one of the words from the list; and providing the selected word to the application program.

13. The method of claim 12, wherein two or more of the clusters contain a common character.

14. The method of claim 12, wherein the clusters contain no overlapping characters.

15. The method of claim 12, further comprising pruning the generated list to remove unlikely matches prior to presenting it to a user.

16. The method of claim 12, further comprising the step of ranking the list in order of likelihood of matching the string os closest matching character identifiers associated with the handwritten characters, said step of ranking further comprising the steps of:

comparing each character in the string of closest matching characters with its corresponding character in each dictionary word in the generated list and assigning a score based upon the number of matches;

ordering the generated list based upon the score; and removing from the ordered list all but the first n words.

17. The method of claim 16, wherein the string of handwritten characters is less than all of the characters in a word being entered, and wherein the step of generating and displaying generates and displays complete words beginning with the string of handwritten characters.

18. A system for providing user generated data to an application computer program, comprising:

means for translating a string of handwritten characters representing the user data into digitized handwriting signals, said string of handwritten characters having been previously generated by a character recognition system;

means for comparing the digitized handwriting signals with electronically stored prototype handwriting signals representing prototype handwritten characters and assigning a closest matching character identifier to each of the digitized handwriting signals;

means for assigning to each closest matching character identifier one or more cluster codes, the cluster codes representing clusters of confusable characters containing the closest matching character;

means for providing, for each combination of cluster codes representing the string of handwriting characters, a string of cluster codes representing the string of handwritten characters;

means for comparing the strings of cluster codes with cluster code strings representing words in a dictionary;

means for generating and displaying a list of words in the dictionary having cluster code strings matching one or more of the strings of cluster codes representing the string of handwritten characters;

means for pruning the generated list to remove unlikely matches prior to presenting it to the user;

means for selecting one of the words from the list; and means for providing the selected word to the application program.

19. A stored program device readable by a computer, having program instructions executable by the computer to perform method steps for handwriting recognition, the method steps comprising:

translating a string of handwritten characters representing the user data into digitized handwriting signals, said string of handwritten characters being generated by a character recognition system prior to said step of translating;

assigning an identifier to each of the digitized handwriting signals;

assigning at least one cluster code to each identifier, said cluster code represents clusters of confusable characters containing a closest matching character associated with said identifier;

providing a string of cluster codes representing the string of handwritten characters;

comparing the string of cluster codes with cluster code strings representing words in a dictionary;

generating a list of words in the dictionary having cluster code strings matching at least one of the string of cluster codes representing the string of handwritten characters;

ranking the generated list in order of likelihood of matching a string of closest matching character identifiers associated with the handwritten characters;

selecting one of the words from the list; and providing the selected word to the application program.

20. The method according to claim 19, further comprising the step of comparing the digitized handwriting signals with electronically stored prototype handwriting signals representing prototype handwritten characters.

21. The method according to claim 19, further comprising the step of pruning the list to remove unlikely matches prior to displaying it to the user.

* * * * *